(12) United States Patent
Pavlov (10) Patent No.: US 6,725,426 B1
(45) Date of Patent: Apr. 20, 2004

(54) MECHANISM FOR TRANSLATING BETWEEN WORD PROCESSING DOCUMENTS AND XML DOCUMENTS

(75) Inventor: John E. Pavlov, Hopkinton, MA (US)

(73) Assignee: Broadvision, Inc., Redwood City, CA (US)

( * ) Notice: Subject to any disclaimer, the term of this patent is extended or adjusted under 35 U.S.C. 154(b) by 0 days.

(21) Appl. No.: 09/528,489

(22) Filed: Mar. 17, 2000

(51) Int. Cl.[7] .......................... G06F 17/00; G06F 17/27
(52) U.S. Cl. ........................ 715/523; 715/513
(58) Field of Search .................. 715/523, 513; 707/3, 102

(56) References Cited

U.S. PATENT DOCUMENTS

| | | | |
|---|---|---|---|
| 6,519,617 B1 * | 2/2003 | Wanderski et al. | 715/513 |
| 6,535,896 B2 * | 3/2003 | Britton et al. | 715/523 |
| 6,569,207 B1 * | 5/2003 | Sundaresan | 715/513 |
| 6,585,778 B1 * | 7/2003 | Hind et al. | 715/513 |
| 6,601,071 B1 * | 7/2003 | Bowker et al. | 707/102 |
| 6,604,100 B1 * | 8/2003 | Fernandez et al. | 707/3 |

OTHER PUBLICATIONS

Chung et al., Design and application of XTML script language based on XML, Dec. 1999, (Abstract Only).*
WorX an easy path to XML, Jan. 26, 2000.*
Alschuler et al., The XML scoop on Office 9, Jul. 5, 1998, XML.com, pp. 1–4.*
Technology reports, SoftQuad XMetal, Nov. 17, 1998, pp. 1–3.*
XDoc XML converter, web document.*
W3C "Extensible Markup Language (XML) 1.0" Retrieved from the Internet at www.w3.org/TR/REC-xml, (Nov. 28, 1999).
Microsoft Corporation "Microsoft MS–DOS, Windows, OS/2, and Apple Macintosh Applications. Versions: RTF Version 1.3. Subject: Rich Text Format (RTF) Specification" Product Support Services Application Note, (1989–1994).

* cited by examiner

Primary Examiner—Sanjiv Shah
(74) Attorney, Agent, or Firm—Lahive & Cockfield, LLP (57) ABSTRACT

A translation mechanism translates between a word processing document and an XML file. The translation facility may translate the word processing document into the XML file and, conversely, may translate the XML file into the word processing document. The mechanism may be partially integrated into a word processing package so that the translation from word processing document to XML file may be performed via the user interface provided by the word processing package. The translation mechanism is extensible and flexible so as to be able to translate different varieties of document types. The translation is performed automatically by a computer system or other electronic device and eliminates the need for the user to be familiar with the syntax of XML.

17 Claims, 7 Drawing Sheets

```
<BRTrans>

<OutProlog ref='mydoc.dcl'></OutProlog>

<Root>
 <Steps>
       <Any>
          <Att
name="SPACEBEFORE"><Ignore><Opt><Any></Any></Opt><
/Ignore></Att>
          <Att>
name="TABDEF"><Ignore><Opt><Any></Any></Opt></Igno
re></Att>
       </Any>
                   ┌─113
       <Seq>
          <!-- INSERT TOP-LEVEL ELEMENT DESCRIPTION
HERE -->   ┌─113'
       </Seq>                          ─112
 </Steps>
 </Root>

<!-- INSERT ELEMENT DEFINITIONS HERE -->
                                    ─114
 </BRTrans>
```

MECHANISM FOR TRANSLATING BETWEEN WORD PROCESSING DOCUMENTS AND XML DOCUMENTS

TECHNICAL FIELD

The present invention relates generally to electronic devices and more particularly to a mechanism for translating between word processing documents and extensible markup language (XML) documents.

BACKGROUND OF THE INVENTION

Most businesses store a large volume of documents on storage media, such as magnetic disks. These documents are often largely comprised of word processing documents that originate from word processing programs. Word processing programs are widely distributed among business, and the storage of the documents as word processing documents has generally worked well for most business.

Recently, however, businesses have desired to provide access to documents over the Internet or via an internal intranet. Such word processing documents cannot readily be displayed via web browsers. As a result, many businesses have sought to convert word processing documents into hypertext markup language (HTML) documents, which are readily viewable by most web browsers. Unfortunately, the conversion of word processing documents into HTML documents is time consuming and error prone.

Another complication for many businesses is that the current trend is away from HTML documents and towards extensible markup language (XML) documents. XML is more flexible than HTML and provides a richer set of capabilities. Many analysts believe that XML will replace HTML as the markup language of choice for content that is viewable on the Internet. As a result, many businesses wish to have their content stored as XML documents. Unfortunately, content is currently stored as word processing documents.

SUMMARY OF THE INVENTION

The present invention addresses the above-described problem by providing a convenient mechanism for converting word processing documents into XML documents. The present invention may also include a mechanism for converting XML documents into word processing documents. The mechanism for converting between word processing documents and XML documents may be directly integrated with the word processing program so that when a user creates a word processing document, the word processing document may be converted into an XML document and persistently stored. The content is, thus, readily available as an XML document for easy display by a web browser or other suitable viewer. This approach allows a user to employ the word processing program as a sort of "XML editor". The user need not learn the syntax of XML; rather the mechanism provides user friendly and transparent conversion of word processing documents into XML documents.

In accordance with one aspect of the present invention, a method is practiced in electronic device, such as a computer system, by a tool that operates on a word processing document. The tool converts the word processing document into an intermediate format and then subsequently converts the document from the intermediate format into an XML document.

In accordance with the further aspect of the present invention, the tool for converting between a word processing document and an XML document is found in an electronic device. The tool includes a first conversion facility for converting between the word processing document and an intermediate format document and a second conversion facility for converting between the intermediate format document and an XML document.

In accordance with the further aspect of the present invention, a method is practiced in a computer system that includes a word processing document in a word processing format. A user of the computer system is presented with a user interface element that enables the user to cause a representation of a word processing document as an XML file to be created. Such an XML file is created in response to the user interacting with user interface element.

BRIEF DESCRIPTION OF THE DRAWINGS

An illustrative embodiment of the present invention will be described below relative to following drawings.

DETAILED DESCRIPTION OF THE INVENTION

The illustrative embodiment of the present invention provides a translation facility for translating between word processing documents and XML documents. The translations may be performed so that a word processing document is converted into a XML document and, conversely, so that an XML document is translated into a word processing document. The illustrative embodiment may include an authoring component that is directly integrated into a word processing package so that the user may create XML files using the word processing package. In the illustrative embodiment, a menu item is provided to a user to allow the user to save a word processing document as an XML document.

The illustrative embodiment enables a business or other party to convert archived word processing documents into XML documents. As a result, the documents may be readily accessed via an Internet connection, an intranet connection, an extranet connection or other network connection. There is no need for the business or other party to go through a cumbersome data translation process, and there is no need to require that all documents be created using XML editor. Instead, the word processing package becomes a type of XML editor that easily archives word processing documents as XML documents so that the documents are accessible via a web browser or other viewer at a client. XML provides reuse capabilities well beyond those provided by HTML. The conversion of documents into XML by a corporation allows the corporation to leverage data contained within the documents across multiple formats and media. Common tags (e.g. names) that are inherent in XML provide sophisticated search mechanisms for locating data contained within documents.

Figure 1:
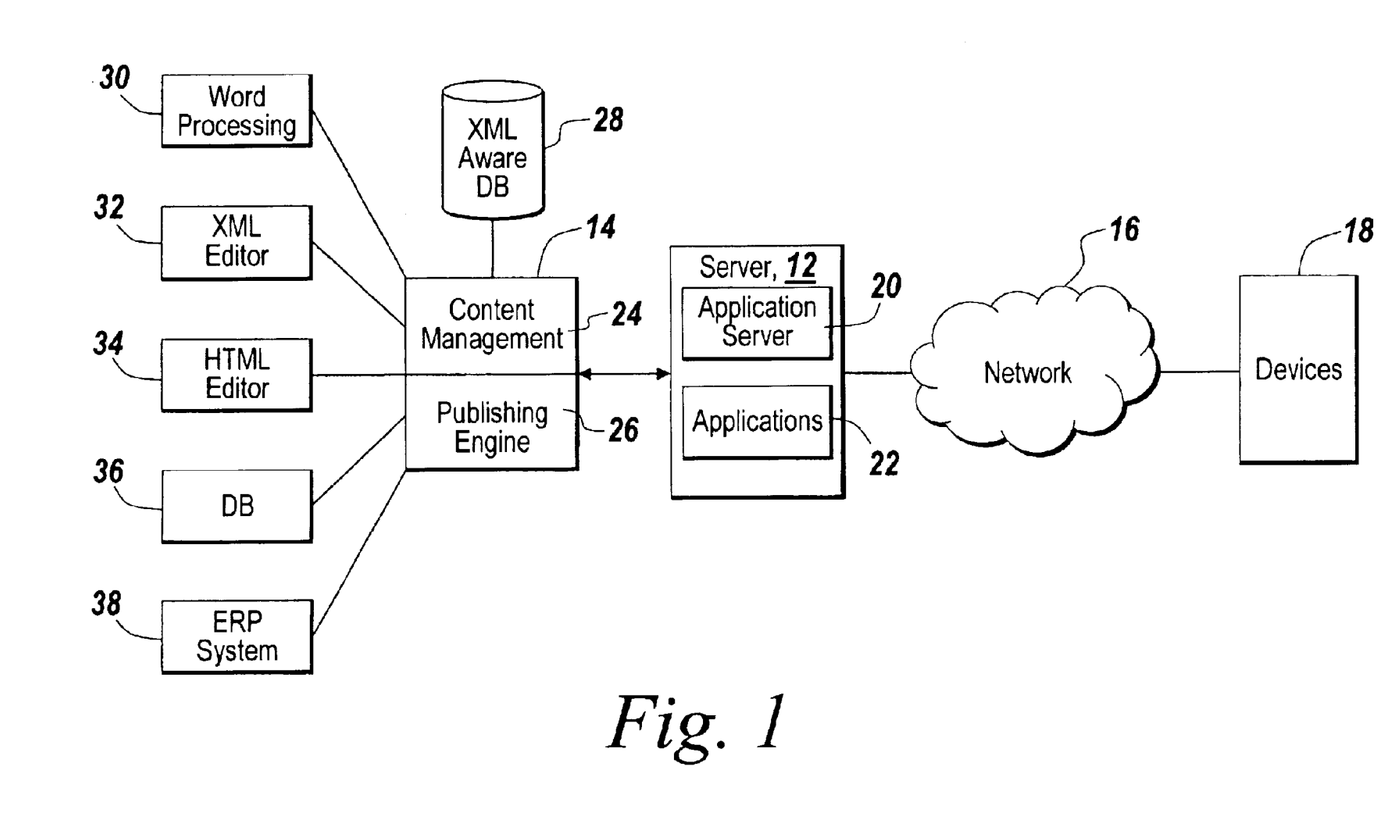
FIG. 1 is a block diagram of a computing environment that is suitable for practicing the illustrative embodiment.

FIG. 1 illustrates a computing environment 10 that is suitable for practicing the illustrative embodiment of the present invention. Those skilled in the art will appreciate that the computing environment depicted in FIG. 1 is intended to be merely illustrative and not limiting of the present invention. The present invention also may be practiced with other configurations.

The computing environment 10 includes a server 12 that may include an application server 20. The server 12 may be a web server that has interfaced with a network 16, such as the Internet. Those skilled in the art will appreciate that the present invention may also be practiced in the environments where the network 16 is an intranet, an extranet or another type of network. The server 12 need not be a web server and need not be an application server.

Server 12 may interface with another server 14. Server 14 may include a content management subsystem 24 for managing content that is accessible by devices 18 over the network 16. A publishing engine 26 may also reside on the server 14. The publishing engine 26 is responsible for publishing content for access by clients over the network 16. Those skilled in the art will appreciate that present invention may also be practiced in environments where the server 12 or the server 14 are separate processes run on a singular physical computing system. The content management subsystem 24 has access to an XML aware database 28. The documents stored within the XML aware database 28 are XML documents. The content management subsystem 24 may receive content from multiple contents sources 30, 32, 34, 36, and 38. The content sources may include a word processing package 30, an XML editor 32, an HTML editor 34, a database 36, and an ERP system 38. The content sources may also include additional varieties of content sources that are not depicted in FIG. 1.

The content management subsystem 24, the publishing engine 26 and server 22 may be implemented using the BladeRunner package sold by Interleaf, Inc. of Waltham, Mass.

For purposes of the discussion below, it is presumed that the word processing package 30 is the Microsoft Word word processing program, sold by Microsoft Corporation of Redmond, Washington. Those skilled in the art will appreciate that the present invention may also be practiced with other word processing packages, including but not limited to Corel WordPerfect, Microsoft Works, etc. An add-on is provided by the content management subsystem 24. The add-on is integrated into the word processing package 30 to facilitate the translation of word processing documents into XML documents.

Content may be retrieved from the XML database 28 and may be passed by the content management subsystem 24 to the publishing engine 26. The publishing engine 26 passes the retrieved content on to the server 12. The server 12 includes executable application programs 22 that apply a style sheet to the content to format the content into a style appropriate for the device 18 that requested the content. Hence, as described in application entitled, "Customization of Output Content Based on Device Type", which was filed on Nov. 30, 1999 and assigned application Ser. No. 09/451,744, the output is customized based upon the type of device to which the content is to be forwarded.

Figure 2:
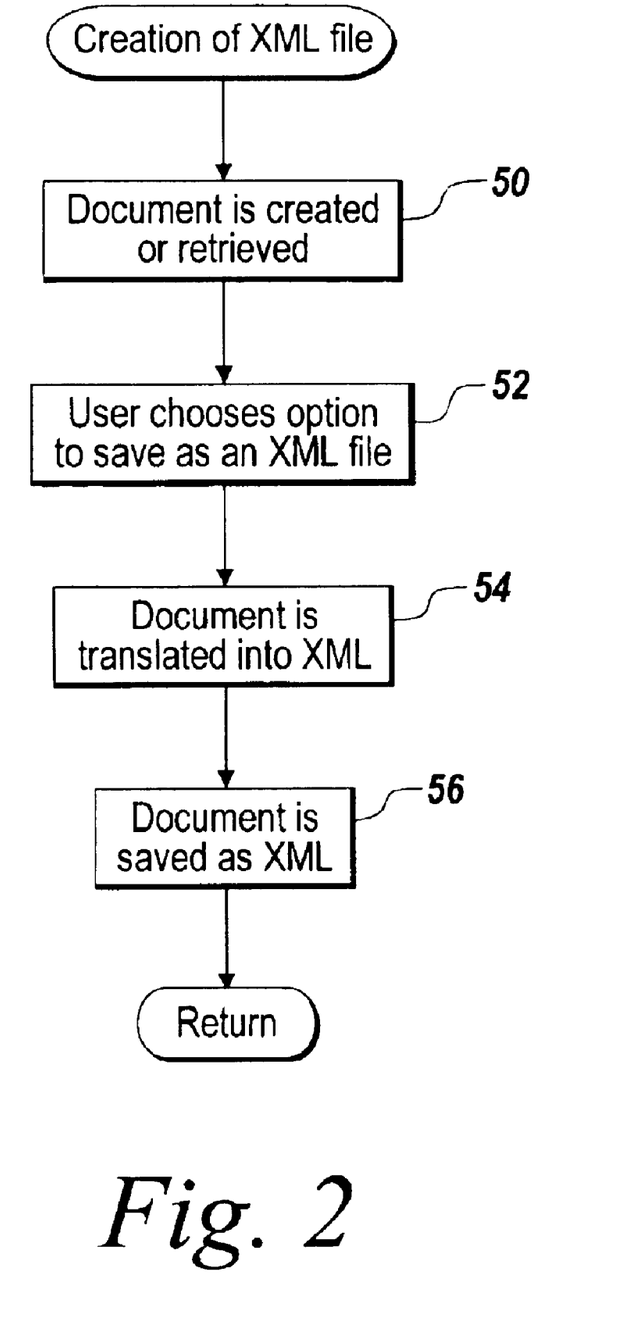
FIG. 2 is a flow chart illustrating the steps that are performed to convert a word processing document into an XML file.
Figure 3:
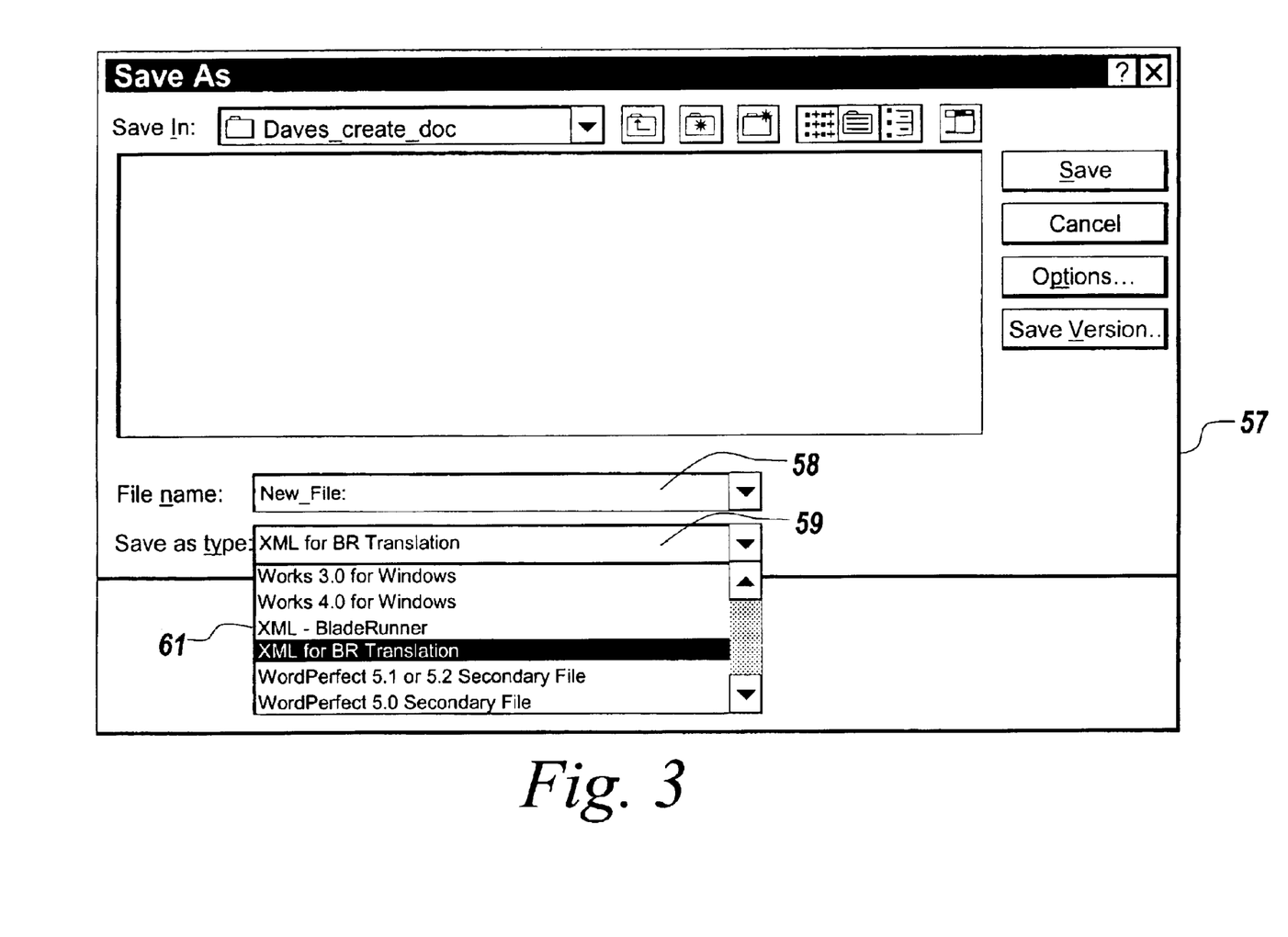
FIG. 3 is an example of a user interface element for enabling a user to save a word processing document as an XML file.

FIG. 2 is a flowchart illustrating the steps that are performed in order for a word processing document to be converted into an XML file. Initially, a word processing document is created or retrieved using the word processing package 32 (step 50 in FIG. 2). The user then chooses an option to save the word processing document as an XML file (step 52 in FIG. 2). FIG. 3 shows an example of a user interface element that may be displayed to the user to enable the user to save the word processing document as an XML file. In the example of FIG. 3, a pop up window 57 presents the user with various user interface elements for specifying the file name of the file to be saved and the type of file to which word processing document is to be saved. In particular, a "file name" list box 58 is provided to enable the user to choose a file name from a list or to enter a file name. A second list box 59 enables the user to select a file type for the file from a list. The file may be stored as a word processing document or may be stored as an XML file. In the example depicted in FIG. 3, the user should choose the XML BladeRunner option 61 for translation of the word processing document into XML.

Those skilled in the art will appreciate that there may be other user interface mechanisms for the user to specify that the word processing document is to be saved as an XML file. For example, a simple text box may be used or a button may be used. Moreover, the conversion of the word processing document into an XML file need not be performed at the time the file is saved; rather the translation may occur at other times. In addition, there may be other user interface elements that explicitly request the conversion of the word processing document to an XML file. In some embodiments, the word processing document may be converted into an XML file and stored as an XML file and affiliated graphics, attachments, links and other annotative data. In other embodiments, the XML file may be generated and stored along with a copy of word processing document in a word processing format.

The document is then translated from a word processing document into an XML file (step 54 in FIG. 2) and saved in persistent storage as an XML file (step 56 in FIG. 2). For the computing environment 10 depicted in FIG. 1, the XML file is saved on the user's file system and may be checked into the XML aware database 28.

Those skilled in the art will appreciate that the present invention need not be limited to the use of an intermediate format. Instead, the present invention is also intended to encompass instances wherein the word processing document is directly translated into XML or where the intermediate product of the translation is not accessible.

The translation of the word processing document into the XML file is performed transparently relative to the user. The user need not be aware of the syntactic requirements of XML. Instead, the user merely activates a simple user interface (such as that described above) mechanism to trigger the translation.

Figure 4:
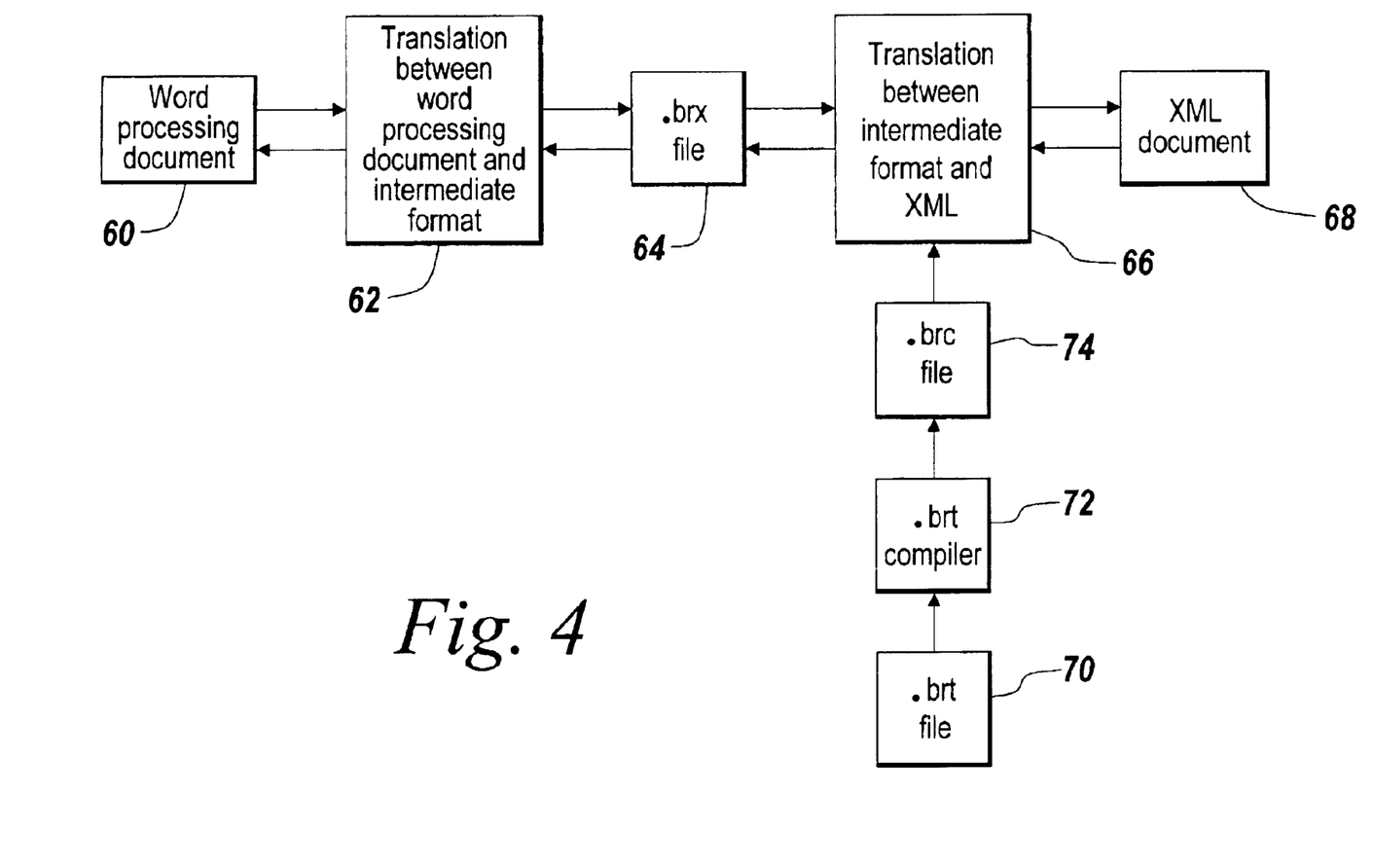
FIG. 4 is a block diagram illustrating the processing flow in the illustrative embodiment.

The translation is performed as a two pass (i.e. stage) process. Initially, the word processing document is translated into an intermediate format in the first pass. In the second pass, the intermediate format document is converted into an XML document. FIG. 4 depicts the flow of activity in the translation process. The word processing document 60 is passed to a first translation facility 62, which is responsible for converting the word processing document into an intermediate format document. The intermediate format document is designated as a ".brx" file 64 in FIG. 4. The ".brx" refers to the extension name of the intermediate format file. The illustrative embodiment presumes that a 8.3 naming scheme is utilized for files. Nevertheless, other naming schemes may be employed. The intermediate format document 64 is passed to a second translation facility 66, which is responsible for translating the intermediate format document into an XML document 68. As will be described in more detail below, the second translation facility 66 uses a .brt file 70 to determine how to convert the intermediate format document 64 into the XML document 68. The .brt file 70 is compiled by a .brt compiler 72 into a compiled version, referred to as a ".brc" file 74 for use by the second translation facility 66. The compiled .brc file 74 executes more quickly than the .brt file 70. The .brt 70 file and the .brc file 74 contain rules specifying how the translation is to be performed.

Those skilled in the art will appreciate that a .brt file or a .brc file need not be used by the present invention. Instead, the rules may be directly encoded in the tool. Moreover, the tool need not be rule-based but rather may employ heuristics that do not technically utilize "rules".

Figure 5:
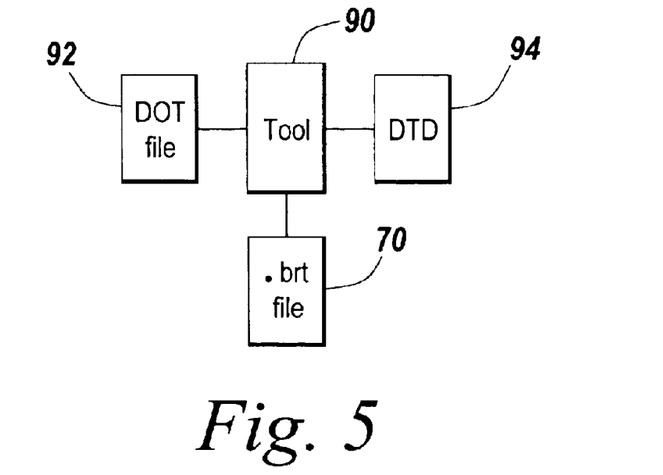
FIG. 5 illustrates the files that are used by the tool of the illustrative embodiment in performing translation.

XML provides the ability for a developer to set forth a document type definition (DTD). The DTD provides a grammar for a class of documents (i.e. it specifies what documents of the specified type are to look like). DTDs are utilized in the illustrative embodiment. A practitioner skilled in the art will also appreciate that other methods of representing the abstract grammar for a class of document, including (but not limited to) XML Schemas and Backus-Naur form descriptions may be used to supplement or replace the use of the DTD. As shown in FIG. 5, for any given category or type of document to which translation is to be applied, a DTD 94 must be defined. The tool 90 (i.e. Interleaf BladeRunner) is provided in the illustrative embodiment for performing the translation, management, and publishing of content and utilizes the DTD. A "DOT" 92 file must also be defined for each document type. The "DOT" file 92 defines the styles that will be used to create documents to ready for exportation to XML. The styles may be, for example, Microsoft Word styles. The DOT file 92 includes macros that execute the functions of the tool 90. For each document type, a .brt file 70 must also be created. As was mentioned above, the .brt file 70 defines the rules that are used to translate styles in the intermediate document format into XML elements.

Figure 6:
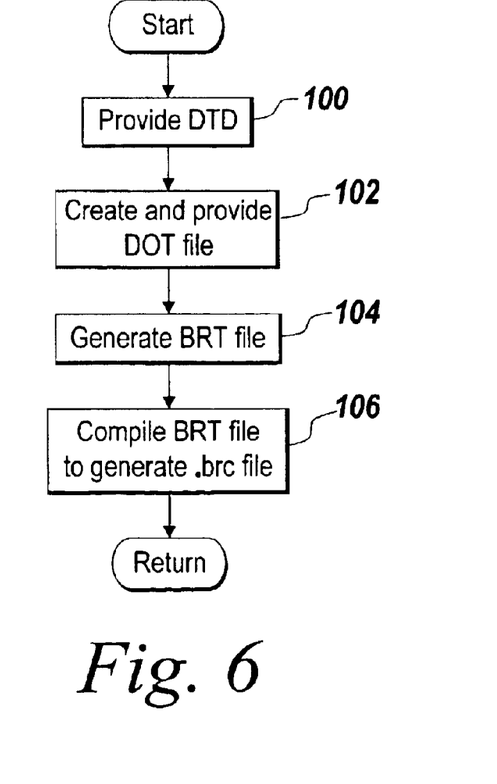
FIG. 6 is a flow chart illustrating initial steps that are performed prior to translation.

FIG. 6 provides a flowchart illustrating preliminary steps that are performed prior to the translation of the word processing document 60 to the XML file 68. Initially, a DTD is provided for the document type (step 100 FIG. 6). In addition, a DOT file 94 must be created and provided (step 102 FIG. 6). A .brt file 70 must be generated for the document type (step 104 FIG. 6). The .brt file must then be compiled to generate a .brc file 74 (step 106 FIG. 6).

The DOT file 94 may be created by an administrator of the computing environment 10. The Interleaf BladeRunner package provides the administrator with a generic BladeRunner DOT file, which contains macros and style definitions for accessing functions of the BladeRunner tool 90. The blank BladeRunner DOT file serves as a good starting point for the administrator to create a DOT file for a given document type. The administrator defines a style for each element that is used to represent the elements of the specified style in the XML document. For example, a style should be entered in the DOT file to identify the types of lists used within a document similarity styles for graphics in the word processing document should have associated styles in the DOT file.

As mentioned above, the administrator also creates a .brt file 70 for each document type. The .brt file defines the rules that will be used by the translation process to convert documents of a specified document type into XML. The word processing document 60 is first converted into the intermediate format (see 64 in FIG. 4) and then the BRT rules from the .brt file 70 are applied against the intermediate format document to produce the XML document 68. The intermediate format document 64 is an XML representation of a Word Rich Text Format (RTF) document (RTF is specification defined by Microsoft Corporation).

Before describing how a .brt file 70 is developed, it is helpful to describe the format of the intermediate format document 64 (FIG. 4). The intermediate format document 64 contains a number of different types of "elements", such as found in XML documents. These elements include a DOC element, which is the root element of this document type.

The intermediate format documents 64 may also contain a SECTION element. The SECTION element is used to represent sections of a word processing document.

The intermediate format document 64 may contain a PARA element for identifying paragraphs in a word processing document.

The intermediate format document 64 may contain a HEADFOOT element, which is used to identify a header/footer within a word processing document.

BOOKSTART/BOOKEND elements are used to identify the start and end, respectively, of bookmarks within a word processing document.

ANNOT elements are used to identify annotations that may appear within a word processing document.

The intermediate format document 64 may contain EXTERNOBJ elements that represent an external object that is imported into the word processing document. Examples of such external object are graphics or OLE objects.

In addition, a FIELD element may be included within the intermediate format document 64 to represent information that has been created as a FIELD.

ROW and CELL elements may be used to identify a portion of a table in word processing document.

A FOOTNOTE element may be present to identify footnotes and endnotes in a word processing document.

A FRAG element may be included to identify any formatting fragments, where each formatting fragment identifies a portion of a paragraph having formatting that differs from the formatting of the paragraph.

Figure 7:
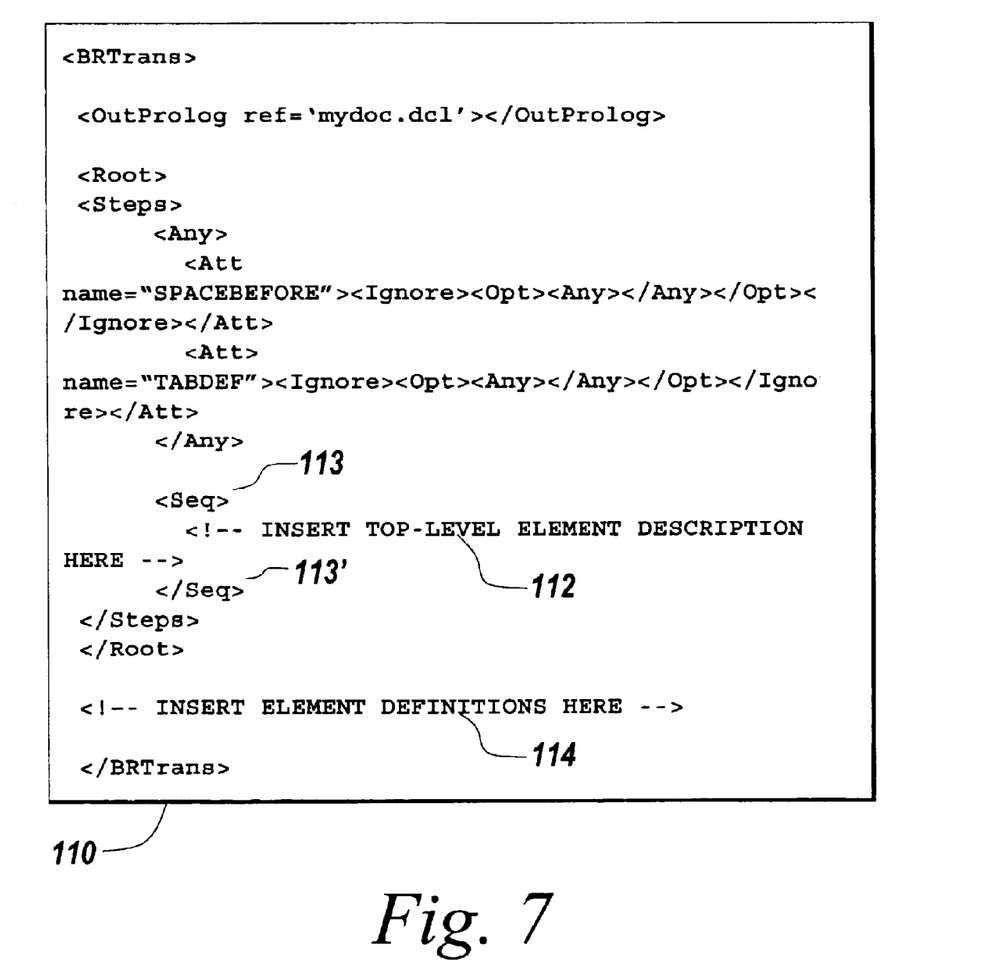
FIG. 7 shows and example of a skeletal version of a DTD file.

As mentioned above, a .brt file 70 must be created. A few examples are helpful to illustrate a .brt file 70. The .brt file 70 contains elements similar to those found in a XML file. The administrator may start off with a .brt file outline 1 10 such as shown in FIG. 7. This outline 110 includes tags such as <BRTrans> </BRTrans> tags, which delineate the beginning and end of the .brt file. Other types of tags are included within the .brt file 70. In addition, comment lines 112 and 114 identify where the administrator is to insert top-level element descriptions and element definitions, respectively. The elements in the intermediate format file 64 are translated by the BRT rules on an element by element basis.

In order to appreciate what additional information needs to be added to the skeletal outline 110 shown in FIG. 7, it is helpful to consider an example. Suppose that the top-level construct in the intermediate format file 64 is as follows:

```
    <DOC>
        <SECTION
            MARGBOT = "1440" MARGLEFT = "1800"
            MARRIGHT= "1800" MARGTOP = "1440"
            ORIENTATION= "PORTRAIT">
```

The construct specifies the margins and orientation of a section of a document. The corresponding top-level element in the XML document 68 is <book>. In order to translate from the intermediate file construct to the XML file construct, it is necessary to add the following text to the .brt file:

```
<Elem inname="DOC" defatts="ignore">
    <Elem inname="SECTION" defatts="ignore">
        <Elem outname="book">
            <!- - INSERT CONTENT DESCRIPTION OF THE TOP-
LEVEL ELEMENT HERE - ->
        </Elem>
    </Elem>
</Elem>
```

The outer two Elem tags describe the "inname" or elements in the intermediate format file 64. The innermost Elem tag describes the "outname" element that is found in the XML document 68. The text set forth above would be inserted between the tags 113 and 113' in the skeletal outline 110.

The .brt file should also include element definitions. For each <!ELEMENT . . . > declaration in the DTD file, the administrator creates a new element definition in the .brt file. The element definitions are created using the<Def>construct. Each non-leaf element definition has the following format:

```
<Def typename="XXX">
    <Elem outname="ZZZ">
        <! - - INSERT CONTENT DESCRIPTION HERE - ->
    </Elem>
</Def>
``` where, XXX is the name of the BRT element and ZZZ is the name of element defined in the DTD.

Each leaf and element definition has the following format:

```
<Def typename="YYY">
    <Elem Inname="YYY" outname "ZZZ">
        <! - - INSERT ATTRIBUTE PARAMETERS HERE - ->
        <! - -    INSERT CONTENT DESCRIPTION HERE - ->
    </Elem>
</Def>
``` where XXX and ZZZ areas defined above, and YYY is the name of the word processing construct as expressed in the intermediate format file 64.

The content descriptions (referenced above) in the element definitions may be generated with assistance of the DTD. In particular, information in the DTD may be mapped to corresponding information in the .brt. The following table summarizes some of the mappings.

| In the DTD, when you see . . . | Add this to the BRT . . . |
|---|---|
| an element name, xxx | <Ref typename="xxx"/> |
| a comma-separated sequence | <Seq> |
| a \|- separated sequence | <Choice> |
| ? | <Opt> |
| * | <Opt><RepList> |
| + | <RepList> |

Figure 8:
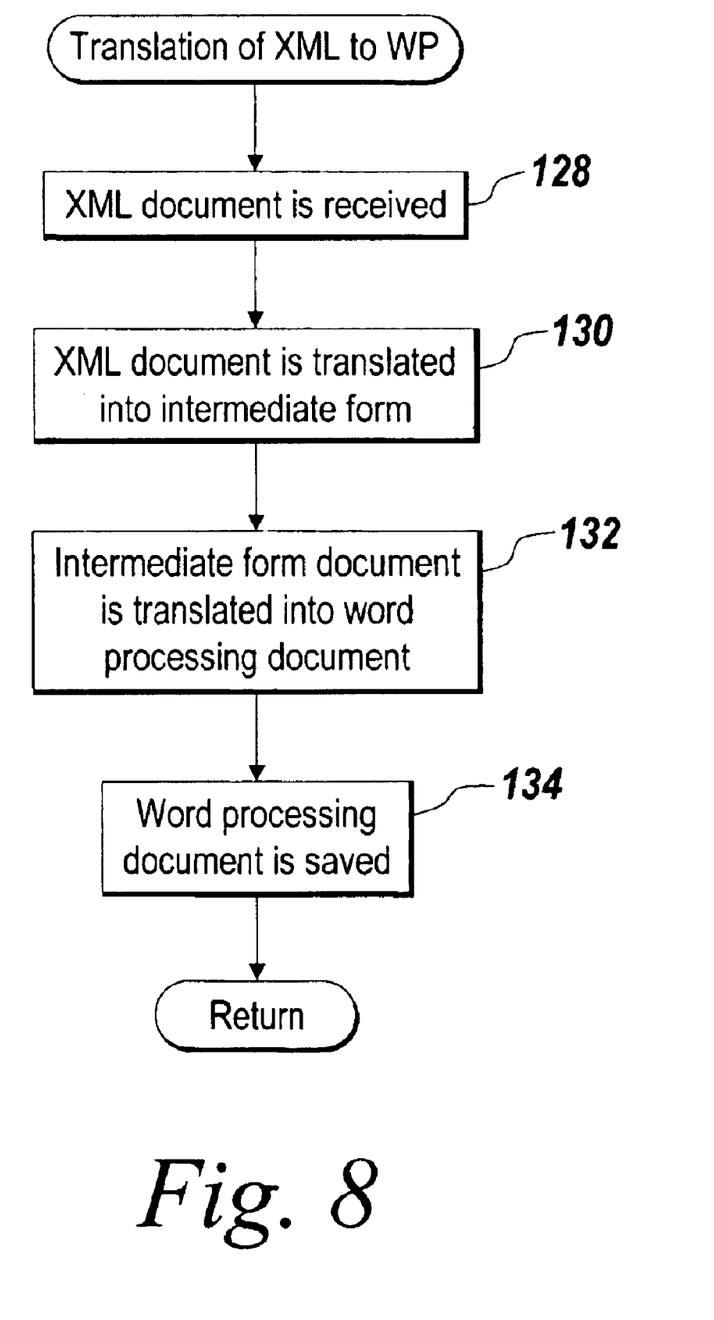
FIG. 8 is a flow chart illustrating the steps that are performed to translate an XML file into a word processing document.

The above discussion has focused primarily on the instance where a word processing document 60 is converted into an XML document 68. As show in FIG. 4, the illustrative embodiment also is able to convert the XML document 68 into a word processing document 60 by reversing the process. In particular, the second facility 66 receives the XML document 68 (step 128 FIG. 8) and translates the XML document into intermediate form (step 130 FIG. 8). The intermediate form document 64 is then translated by the first facility 62 into a word processing document 60 (step 132 FIG. 8). The word processing document is then saved (step 134 FIG. 8).

The present invention has been described with reference to an illustrative embodiment thereof, those skilled in the art will appreciate the various changes in form detail may be made without departing from the intended scope of the present invention define in the independent claims.

What is claimed is:

1. In an electronic device, a method, comprising the steps of:
   providing a word processing document;
   providing a software tool for the conversion of a word processing document into an Extensible Markup, Language (XML) document, said software tool using a set of grammar rules associated with a document type, a set of style rules to apply to said document during said conversion, and a set of translation rules to use in said conversion;
   converting the word processing document into an intermediate format; and
   converting the document in the intermediate format into an (XML) document using said software tool, said software tool applying said associated grammar rules, said set of style rules and said set of translation rules during said conversion.

2. The method claim 1 wherein the electronic device is a computer system.

3. The method of claim 1 wherein the set of grammar rules is one of an XML schema and an XML Document Type Definition (DTD).

4. The method of claim 1 wherein the said intermediate format is rich text format (.rtf).

5. The method of claim 1 wherein a file specifies the translation rules and wherein the tool uses the file in performing the converting.

6. The method of claim 5 wherein the translation rules used by said software tool during said converting are defined for one of an associated XML DTD and one of an XML schema.

7. A storage medium for use with an electronic device, said storage medium holding executable steps for performing a method, said method comprising the steps of:
   providing a word processing document;
   providing a software tool for the conversion of a word processing document into an Extensible Markup Language (XML) document, said software tool using a set of grammar rules associated with a document type, a set of style rules to apply to said document during said conversion, and a set of translation rules to use in said conversion;

converting a said word processing document into an intermediate format; and converting the document in the intermediate format into an (XML) document using said software tool, said software tool applying said associated grammar rules, said set of style rules and said set of translation rules during said conversion.

8. The storage medium of claim 7 wherein the of grammar rules is one of an XML schema and an XML Document Type Definition (DTD).

9. The storage medium of claim 7 wherein a file specifies the translation rules and wherein the tool uses the file in performing the converting.

10. The storage medium of claim 9 wherein the translation rules used by said software tool during said converting are defined for one of an associated XML DTD and one of an XML schema.

11. In an electronic device, a tool for converting between a word processing document and an extensible markup language (XML) document, comprising:

a first conversion facility for converting between the word processing document and an intermediate format document that is in an intermediate format; and a second conversion facility for converting between the intermediate format document and the XML document.

12. The tool of claim 11 wherein the first conversion facility converts the word processing document into the intermediate format document.

13. The tool of claim 12 wherein the second conversion facility converts the intermediate format document into the XML document.

14. The tool of claim 11 wherein the second conversion facility converts the intermediate format document into the XML document.

15. The tool of claim 11 wherein the second conversion facility converts to the XML document into the intermediate format document.

16. The tool of claim 15 wherein the first conversion facility converts the intermediate format document into the word processing document.

17. The tool of claim 11 wherein the first conversion facility converts the intermediate format document into the word processing document.

* * * * *